(12) United States Patent
Marchitto et al.

(10) Patent No.: US 8,546,986 B2
(45) Date of Patent: Oct. 1, 2013

(54) STATOR CONNECTOR

(75) Inventors: Luciano Marchitto, Pianezza (IT); Nicola Re, Rivalta di Torino (IT)

(73) Assignee: Gate S.R.L., Turin (IT)

( * ) Notice: Subject to any disclaimer, the term of this patent is extended or adjusted under 35 U.S.C. 154(b) by 207 days.

(21) Appl. No.: 13/007,205

(22) Filed: Jan. 14, 2011

(65) Prior Publication Data

US 2011/0175471 A1 Jul. 21, 2011

(30) Foreign Application Priority Data

Jan. 15, 2010 (IT) ............................... TO2010A0026

(51) Int. Cl.
*H02K 11/00* (2006.01)
*H02K 1/00* (2006.01)

(52) U.S. Cl.
USPC ............................... 310/71; 310/179; 310/180

(58) Field of Classification Search
USPC .......................................... 310/71, 179, 180
See application file for complete search history.

(56) References Cited

U.S. PATENT DOCUMENTS

| | | | | |
|---|---|---|---|---|
| 5,900,687 A | * | 5/1999 | Kondo et al. .................... | 310/71 |
| 6,011,339 A | * | 1/2000 | Kawakami .................... | 310/208 |
| 6,030,260 A | * | 2/2000 | Kikuchi et al. ................ | 439/890 |
| 6,600,244 B2 | * | 7/2003 | Okazaki et al. ................. | 310/71 |
| 2003/0201688 A1 | * | 10/2003 | Yamamura et al. ........... | 310/216 |
| 2005/0242678 A1 | * | 11/2005 | Rittmeyer ..................... | 310/179 |
| 2006/0103247 A1 | * | 5/2006 | Kotajima ......................... | 310/71 |
| 2006/0138883 A1 | * | 6/2006 | Yagai et al. ..................... | 310/71 |
| 2007/0296292 A1 | * | 12/2007 | Kienzler et al. ................ | 310/71 |
| 2008/0150377 A1 | * | 6/2008 | Yamaguchi et al. ............ | 310/71 |
| 2008/0231133 A1 | * | 9/2008 | Staudemann et al. ... | 310/154.45 |
| 2009/0026860 A1 | * | 1/2009 | Ohuchi et al. ................... | 310/71 |
| 2009/0200879 A1 | * | 8/2009 | Ghodsi-Khameneh et al. .............................. | 310/71 |
| 2010/0109457 A1 | * | 5/2010 | Sugiyama et al. .............. | 310/71 |
| 2010/0141067 A1 | * | 6/2010 | Kitagawa ........................ | 310/71 |
| 2010/0187924 A1 | * | 7/2010 | Yagai et al. ..................... | 310/71 |

* cited by examiner

*Primary Examiner* — Tran Nguyen
*Assistant Examiner* — Alex W Mok
(74) *Attorney, Agent, or Firm* — Muncy, Geissler, Olds & Lowe, PLLC

(57) ABSTRACT

A stator connector has an annular carrier structure adapted to be superposed on and fixed to the central annular portion of the stator and manufactured from an electrically insulating plastic overmolded onto a group of N conducting members which are separated from each other and electrically insulated by said plastic and having a generally arcuate shape. The conducting members have respective first projections extending out of the annular carrier structure. These first projections are adapted to be connected, in particular by soldering or welding, to terminals or ends of coils of the stator. Each conducting member further has at least one additional connection projection extending out of the annular carrier structure to form phase terminals for the stator.

14 Claims, 4 Drawing Sheets

STATOR CONNECTOR

CROSS REFERENCE TO RELATED APPLICATIONS

This non-provisional patent application claims priority under 35 U.S.C. §119(a) from Patent Application No. TO2010A000026 filed in Italy on Jan. 15, 2010.

FIELD OF THE INVENTION

This invention relates to a connector for the stator of a permanent magnet brushless direct-current motor.

BACKGROUND OF THE INVENTION

More specifically, the invention relates to a connector for the stator of a permanent magnet brushless direct-current motor with N phases, of the type in which the stator is disposed inside the rotor and has a central ring portion from which there extends out radially a plurality of teeth, on each of which a respective coil is wound; the connector having a multiplicity of terminals to which there are connectable, in at least one predetermined mode, at least some of said coils to form the N phase windings of the stator.

The axial length or height of a motor is an important design dimension. The smaller the motor the more space available for other items or the possibility of making a smaller and lighter apparatus driven by the motor. The stator connector is one item which occupies axial space of the motor. By reducing the height of the connector, the axial length of the motor may be reduced.

It is an object of the present invention to provide a connector of this construction that is compact in the axial direction.

SUMMARY OF THE INVENTION

Accordingly, in one aspect thereof, the present invention provides a connector for a stator of a N-phase, permanent magnet brushless direct current motor of the kind in which the stator is disposed inside the rotor and has a central ring portion with a plurality of outwardly extending stator poles or teeth, on each of which a respective coil is wound; the connector having a plurality of terminals to which terminals at least some of the coils are connectable according to at least one predetermined manner for forming the N-phase windings of the stator; wherein the connector comprises an annular carrier structure adapted to be juxtaposed and fixed to the annular central portion of the stator, and which is manufactured with an electrically insulating plastic material overmolded on a group of N conducting members which are separated and electrically insulated from one another by means of the plastic material and are generally shaped like an arc of a circle, and have respective first projections which extend outside the annular carrier structure; the first projections being adapted to be connected, in particular by welding or soldering, to terminals or ends of the coils of the stator; each of the N conducting members being further provided with at least one respective connecting projection which extends outside the annular carrier structure and intended to act as a phase terminal of the stator.

Preferably, the conducting members have an essentially rectangular transverse cross-section, and at least one of them has the longer side of the transverse cross-section which is parallel to the axis of the connector and at least two of the other conducting members have the longer side of their transverse cross-section which is orthogonal to the axis; all the conducting members being disposed essentially coaxial with the axis, axially spaced from one another, in a superimposed relationship.

Preferably, the connecting projections of the conducting members are longer than the first projections in a direction parallel to the axis of the connector.

Preferably, the annular carrier structure is provided with openings through which members extend for the fastening the connector to the stator.

Preferably, the first projections have a U-shaped portion for receiving a respective end of the coils.

According to a second aspect, the present invention also provides a brushless direct current motor having an outer rotor and an inner stator, the stator incorporating a connector as defined above.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
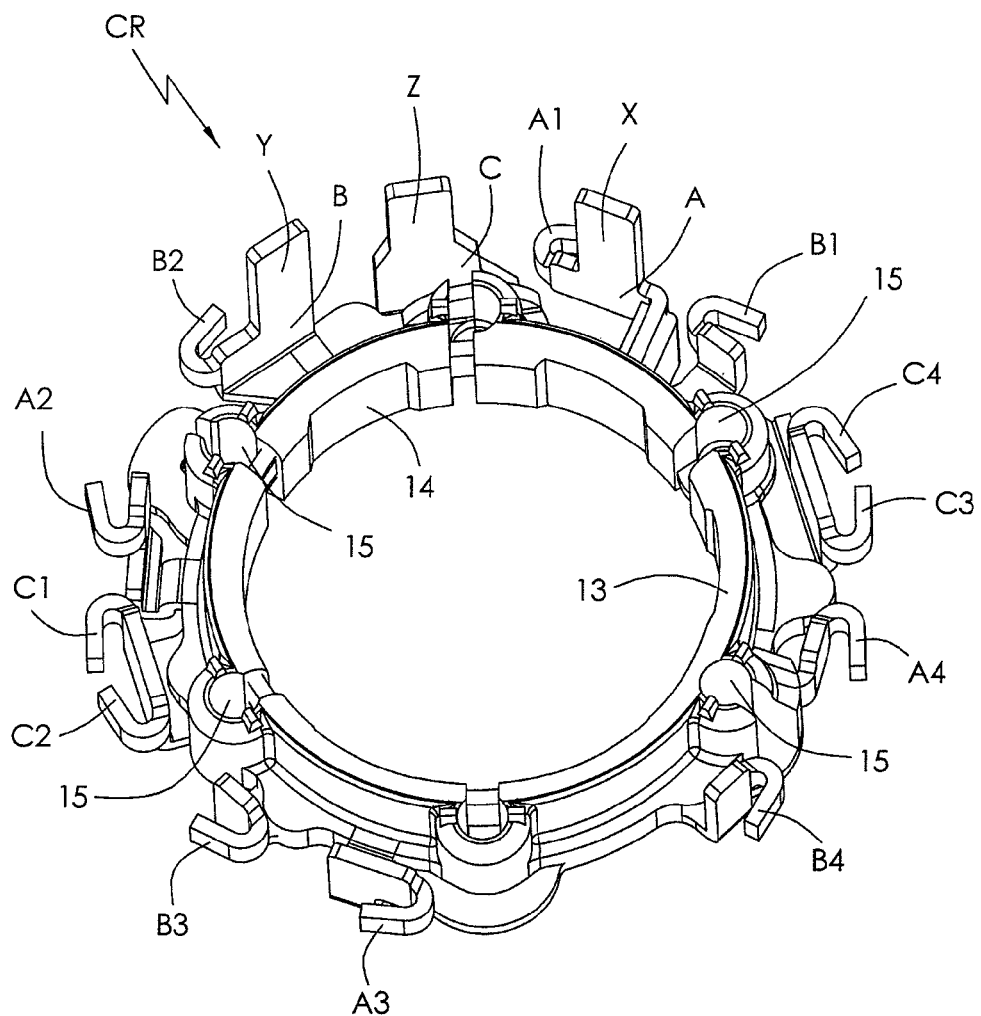
FIG. 1 is a view of a connector according to the present invention.
Figure 3:
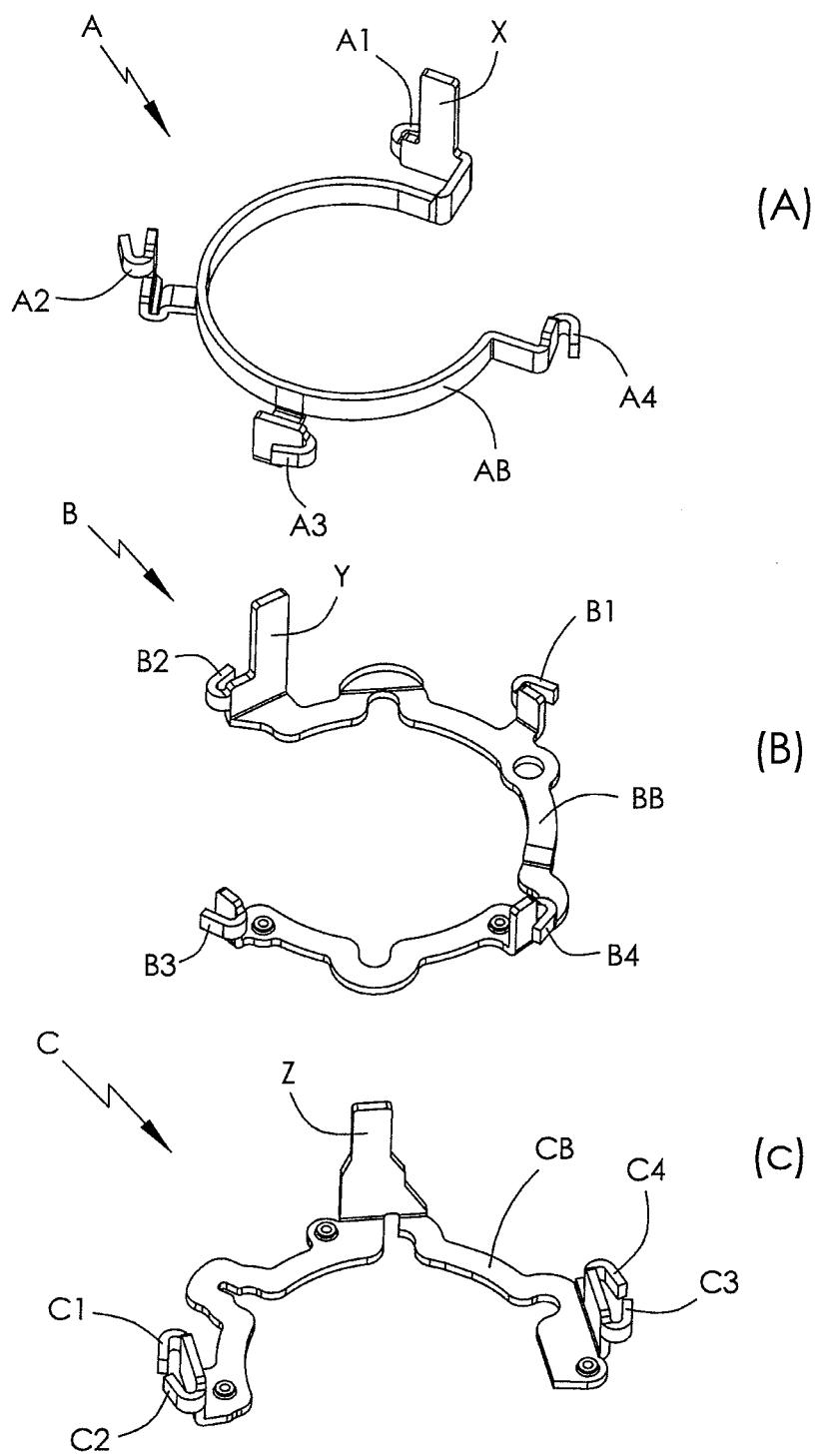
FIG. 3 is an exploded view showing the individual conductor members of FIG. 2.
Figure 4:
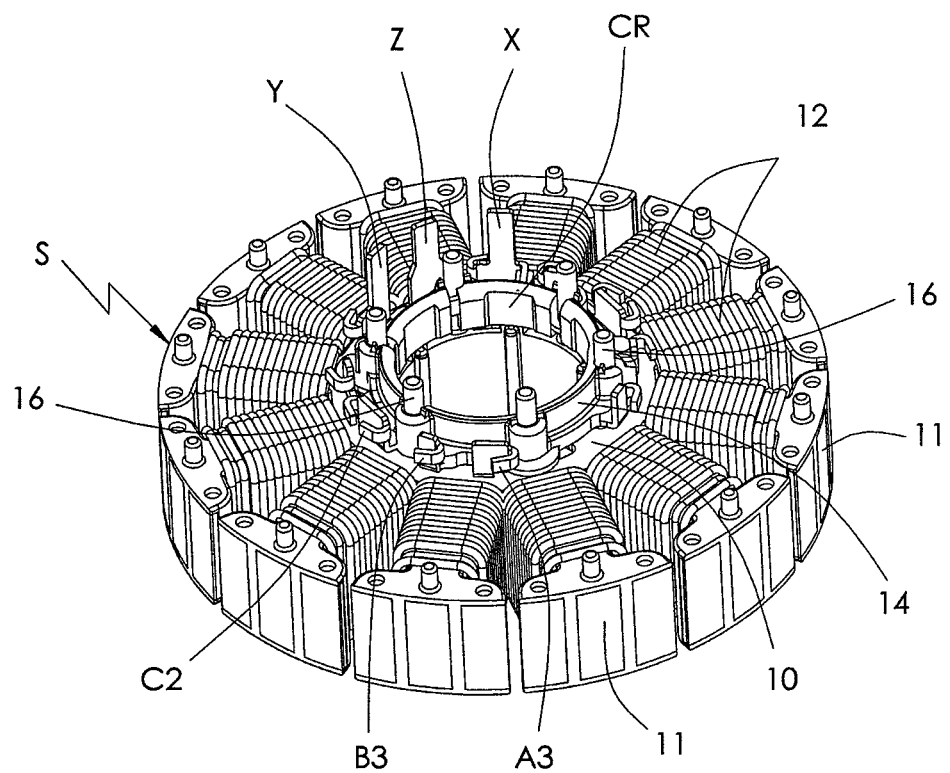
FIG. 4 illustrates a stator of a three-phase brushless motor provided with the connector of FIG. 1.

In FIGS. 1 and 4, CR is a general reference sign for a connector for the stator of a three-phase brushless direct-current motor. In FIG. 4, the stator is marked S, and is of the type designed to be mounted inside a permanent magnet rotor (not shown). In a manner known per se the stator S has a magnetically conducting structure, preferably realized as a stack of laminations, comprising a central ring portion 10 from which there extends out radially a plurality of teeth 11 forming the stator poles, around each of which a respective coil 12 is wound. The connector CR comprises an annular carrier structure 14 which is operationally superposed on and fixed to the annular portion 10 of the stator S. This annular structure 14 is manufactured from an electrically insulating plastic overmolded onto a group of N=3 shaped conducting members marked A, B and C in FIGS. 2 and 3. The general shape of the conducting members A, B and C is essentially an arc of a circle. These members are separated from each other and electrically insulated by the plastic that forms the molded annular carrier structure 14. The members A, B and C have respective bodies AB, BB, CB and first projections A1-A4, B1-B4 and C1-C4 which extend from the bodies AB, BB, CB are essentially U-shaped, to form a hook for attachment of a lead wire of a stator coil.

The first projections extend out of the annular insulating carrier structure 14, all to the same first side of this structure. That is, the first projections extend radially outwardly from an inner ring 13 of the annular carrier structure. The first projections are intended to be connected, particularly by soldering or welding (fusing), to terminals or ends of the coils 12 of the stator S.

The first projections A1-A4, B1-B4 and C1-C4 are placed in respective angular positions such that they are connectable, in at least one predefined mode, to the terminals of the individual coils 12, so as to form the N=3 phase windings of the stator S. In particular, the configuration shown in the drawings permits the construction of three phase windings, each comprising four coils, connectable to the first projections in such a way that each phase winding comprises four series or parallel connected coils, or comprises the parallel connection of two branches each comprising two series-connected coils.

Advantageously, in the embodiment shown in the drawings, the conducting members A, B and C are essentially rectangular in transverse section.

Figure 2:
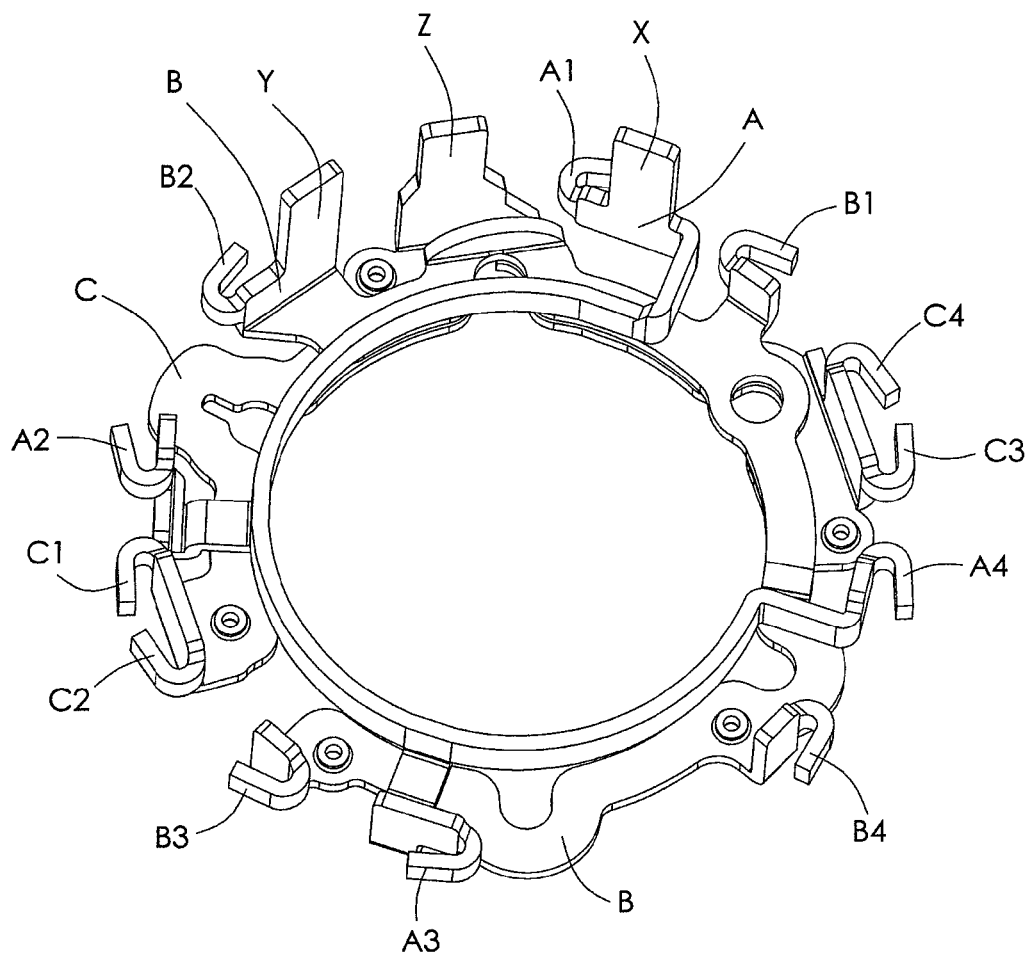
FIG. 2 illustrates three conductor members of the connector of FIG. 1.

With particular reference to FIGS. 2 and 3, the long sides of the respective transverse section of the conducting members B and C are orthogonal to the axis of the connector CR, while the long side of the respective transverse section of the other conducting member A is parallel to this axis. All three conducting members are essentially co-axial with the axis of the connector. The member A is essentially superposed on the conducting members B and C when viewed in a direction essentially parallel to the axis of the connector, as shown in FIG. 2.

The conducting members A, B and C also each have additional connecting projections, marked X, Y and Z, that act as phase terminals for the stator S. These connecting projections X, Y and Z are advantageously longer than the first projections A1-A4, B1-B4 and C1-C4 in the direction parallel to the axis of the connector.

Advantageously, in the process of molding the annular structure 14 of the connector CR a plurality of through holes 15 is provided, preferably at equal intervals, for the passage of corresponding members 16 (FIG. 4) for attachment to the stator S.

The term brushless direct current motor, (and its abbreviation BLDC motor and variations there of) is intended to be used to cover motors without brushes and supplied with power from a substantially DC power supply, including the so called BLAC motors which are a variation of BLDC motor in which the controller converts the DC power to a waveform which is closer to a sinusoidal wave than the traditional square wave and variations there of typically used to drive BLDC motors. Typically, the DC power source may be a battery supply or a rectified AC supply.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A connector for a stator of a N-phase, permanent magnet brushless direct current motor of the kind in which the stator is disposed inside the rotor and has a central ring portion with a plurality of outwardly extending stator poles or teeth, on each of which a respective coil is wound; the connector having a plurality of terminals to which terminals at least some of said coils are connectable according to at least one predetermined manner for forming the N-phase windings of the stator;

wherein the connector comprises an annular carrier structure adapted to be juxtaposed and fixed to the annular central portion of the stator, the annular carrier structure comprises an electrically insulating plastic material overmolded on a group of N conducting members which are separated and electrically insulated from one another by means of the plastic material and are generally shaped like an arc of a circle, and have respective first projections which extend radially outside the annular carrier structure; said first projections being adapted to be connected to terminals or ends of said coils of the stator;

each of the N conducting members being further provided with at least one respective connecting projection which extends outside the annular carrier structure and intended to act as a phase terminal of the stator.

2. The connector of claim 1, wherein the conducting members have an essentially rectangular transverse cross-section, and at least one of them has the longer side of the transverse cross-section which is parallel to the axis of the connector and at least two of the other conducting members have the longer side of their transverse cross-section which is orthogonal to the axis; all the conducting members being disposed essentially coaxial with the axis, axially spaced from one another, in a superimposed relationship.

3. The connector of claim 1, wherein the connecting projections of the conducting members are longer than the first projections in a direction parallel to the axis of the connector.

4. The connector of claim 1, wherein said annular carrier structure is provided with openings through which members extend for the fastening the connector to the stator.

5. The connector of claim 1, wherein the first projections have a U-shaped, portion for receiving a respective end of the coils.

6. A brushless direct current motor having an outer rotor and an inner stator, the stator incorporating the connector of claim 1.

7. A stator comprising:
a stator core having a ring portion extending in an axial direction and stator poles extending radially and outwardly from the ring portion;
stator coils wound on the stator poles and having coil terminals; and
a connector fixed to the stator core radially inside of the stator coils and comprising an electrically insulating carrier and conducting members electrically insulated from each other by the carrier, each of the conducting members being a monolithic member comprising a body, and at least one first projection and at least one second projection which integrally extend from the body, the first projection being electrically coupled to corresponding a coil terminal, the second projection being adapted to be electrically coupled to an external power supply.

8. The stator of claim 7, wherein the carrier comprises an inner ring, and the first and second projections are arranged radially between the inner ring and the stator coils.

9. The stator of claim 8, wherein the bodies of the conducting members are axially spaced from each other.

10. The stator of claim 9, wherein the body of each of the conducting members forms an arc of a circle coaxial with the ring portion.

11. The stator of claim 8, wherein the second projection is longer than the first projection in the axial direction.

12. The stator of claim 7, wherein at least one of the bodies of the conducting members has an axial dimension greater than the bodies of at least two of the other conducting members.

13. The stator of claim 12, wherein the bodies of the conducting members have an essentially rectangular axial cross-section, the body of at least one of the conducting members has the longer sides of the axial cross-section parallel to the axial direction, and the bodies of at least two of the other conducting members have the longer sides of their axial cross-section orthogonal to the axial direction.

14. The stator of claim 7, wherein said carrier structure is provided with openings through which members extend for the fastening the connector to the stator.

* * * * *